(12) United States Patent
Hopkins, Jr. et al.

(10) Patent No.: US 9,828,479 B2
(45) Date of Patent: Nov. 28, 2017

(54) POROUS POLYBENZIMIDAZOLE RESIN AND METHOD OF MAKING SAME

(71) Applicant: PBI Performance Products, Inc., Charlotte, NC (US)

(72) Inventors: John B. Hopkins, Jr., Pineville, NC (US); Karin M. Hudson, Charlotte, NC (US); Gregory S. Copeland, Tega Cay, SC (US); Michael Gruender, Charlotte, NC (US)

(73) Assignee: PBI Performance Products, Inc., Charlotte, NC (US)

( * ) Notice: Subject to any disclaimer, the term of this patent is extended or adjusted under 35 U.S.C. 154(b) by 202 days.

(21) Appl. No.: 13/934,265

(22) Filed: Jul. 3, 2013

(65) Prior Publication Data

US 2013/0331470 A1    Dec. 12, 2013

Related U.S. Application Data

(62) Division of application No. 13/014,976, filed on Jan. 27, 2011, now abandoned.

(60) Provisional application No. 61/301,261, filed on Feb. 4, 2010.

(51) Int. Cl.
*C08J 9/00* (2006.01)
*C08J 3/09* (2006.01)
*C08J 3/11* (2006.01)
*C08J 9/28* (2006.01)

(52) U.S. Cl.
CPC .............. *C08J 9/00* (2013.01); *C08J 3/096* (2013.01); *C08J 3/097* (2013.01); *C08J 3/11* (2013.01); *C08J 9/28* (2013.01); *C08J 2201/0542* (2013.01); *C08J 2205/04* (2013.01); *C08J 2379/04* (2013.01); *Y10T 428/2982* (2015.01)

(58) Field of Classification Search
CPC ..... C08J 3/096; C08J 3/097; C08J 3/11; C08J 9/00; C08J 9/28; C08J 2201/0542; C08J 2205/04; C08J 2379/04; Y10T 428/2982
See application file for complete search history.

(56) References Cited

U.S. PATENT DOCUMENTS

| | | |
|---|---|---|
| RE26,065 E | 7/1966 | Marvel et al. |
| 3,502,606 A | 3/1970 | Conciatori et al. |
| 4,321,182 A | 3/1982 | Davitt et al. |
| 4,506,068 A | 3/1985 | Choe et al. |
| 4,628,067 A | 12/1986 | Chen et al. |
| 4,785,038 A | 11/1988 | Sweeny |
| 4,800,188 A | 1/1989 | Shepherd |
| 4,814,530 A | 3/1989 | Ward et al. |
| 4,828,699 A | 5/1989 | Soehngen |
| 5,066,697 A | 11/1991 | Sandor et al. |
| 5,147,895 A | 9/1992 | Hughes et al. |
| 5,169,871 A | 12/1992 | Hughes et al. |
| 5,223,550 A | 6/1993 | Hughes et al. |
| 5,229,448 A * | 7/1993 | Cooper ................... 524/404 |
| 5,247,010 A * | 9/1993 | Hughes ............... B01J 19/26 524/606 |
| 5,674,614 A | 10/1997 | Onishi et al. |
| 5,902,876 A | 5/1999 | Murata et al. |
| 6,998,464 B2 | 2/2006 | Guth et al. |
| 2004/0262227 A1* | 12/2004 | Kiefer et al. ............. 210/650 |
| 2007/0151926 A1 | 7/2007 | Calundann et al. |

\* cited by examiner

*Primary Examiner* — Irina S Zemel
(74) *Attorney, Agent, or Firm* — Hammer & Associates, P.C.

(57) ABSTRACT

A porous polybenzimidazole (PBI) particulate resin is disclosed. This resin is easily dissolved at ambient temperatures and pressures. The resin is made by: dissolving a virgin PBI resin in a highly polar solvent; precipitating the dissolved PBI in a bath; and drying the precipitated PBI, the dried precipitated PBI being porous. The porous PBI resin may be dissolved by: mixing a porous PBI resin with a highly polar solvent at ambient temperatures and pressures to form a solution.

12 Claims, 6 Drawing Sheets

POROUS POLYBENZIMIDAZOLE RESIN AND METHOD OF MAKING SAME

RELATED APPLICATION

The instant application claims the benefit of Provisional Application Ser. No. 61/301,261 filed Feb. 4, 2010, and co-pending application Ser. No. 13/014,976 filed Jan. 27, 2011.

FIELD OF THE INVENTION

The invention is directed to a polybenzimidazole (PBI) resins, specifically, a porous PBI resin that is easily dissolved, the method of making that resin, and the method of making a solution with that resin.

BACKGROUND OF THE INVENTION

Polybenzimidazole (PBI) resins are difficult to dissolve into a solution. Moreover, the process for dissolving PBI resins typically requires high temperatures, high pressures, and high shear rates. The solutions that can be formed require the use of exotic solvents, have low concentrations of dissolved PBI, are unstable over time without stabilizers (e.g., they gel or precipitate out). The exotic solvents include: concentrated sulfuric acid ($H_2SO_4$), formic acid, dimethyl sulfoxide (DMSO), N,N-dimethyl acetamide (DMAc), N,N-dimethyl formamide (DMF), N-methyl-2-pyrrolidone (NMP), pyridine, and a mixture of a base, a liquid sulfoxide, and water or alcohol. See U.S. Pat. Nos. Re 26,065; 3,502,606; 4,321,182; 4,785,038; 5,066,697; 5,674,614; 5,902,876; & 6,998,464, incorporated herein by reference. These unstable solutions can be stabilized. Stabilizing compounds include, for example, lithium chloride, zinc chloride, N-methyl morpholine, triethyl amine, triethanol amine, organo-lithium compounds (such as lithium stearate), and ammonium acetate. See U.S. Pat. Nos. 3,502,606; 4,321,182; & 5,066,697, incorporated herein by reference.

In the coatings industry, manufacturers prefer solutions that have high concentration, low viscosity, long shelf lives, high purity (free of contaminants like, for example, lithiums, chlorides, or the like), and are hassle-free (e.g., are provided in a ready to use form or are easily mixed, that is do not require high temperatures, pressures, and shears).

Accordingly, there is a need for a polybenzimidazole resin that can be quickly and easily (i.e., at ambient temperatures and pressures and with readily available and commonly used mixing equipment) dissolved.

SUMMARY OF THE INVENTION

A porous polybenzimidazole (PBI) particulate resin is disclosed. This resin is easily dissolved at ambient temperatures and pressures. The resin is made by: dissolving a virgin PBI resin in a highly polar solvent; precipitating the dissolved PBI in a bath; and drying the precipitated PBI, the dried precipitated PBI being porous. The porous PBI resin may be dissolved by: mixing a porous PBI resin with a highly polar solvent at ambient temperatures and pressures to form a solution.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
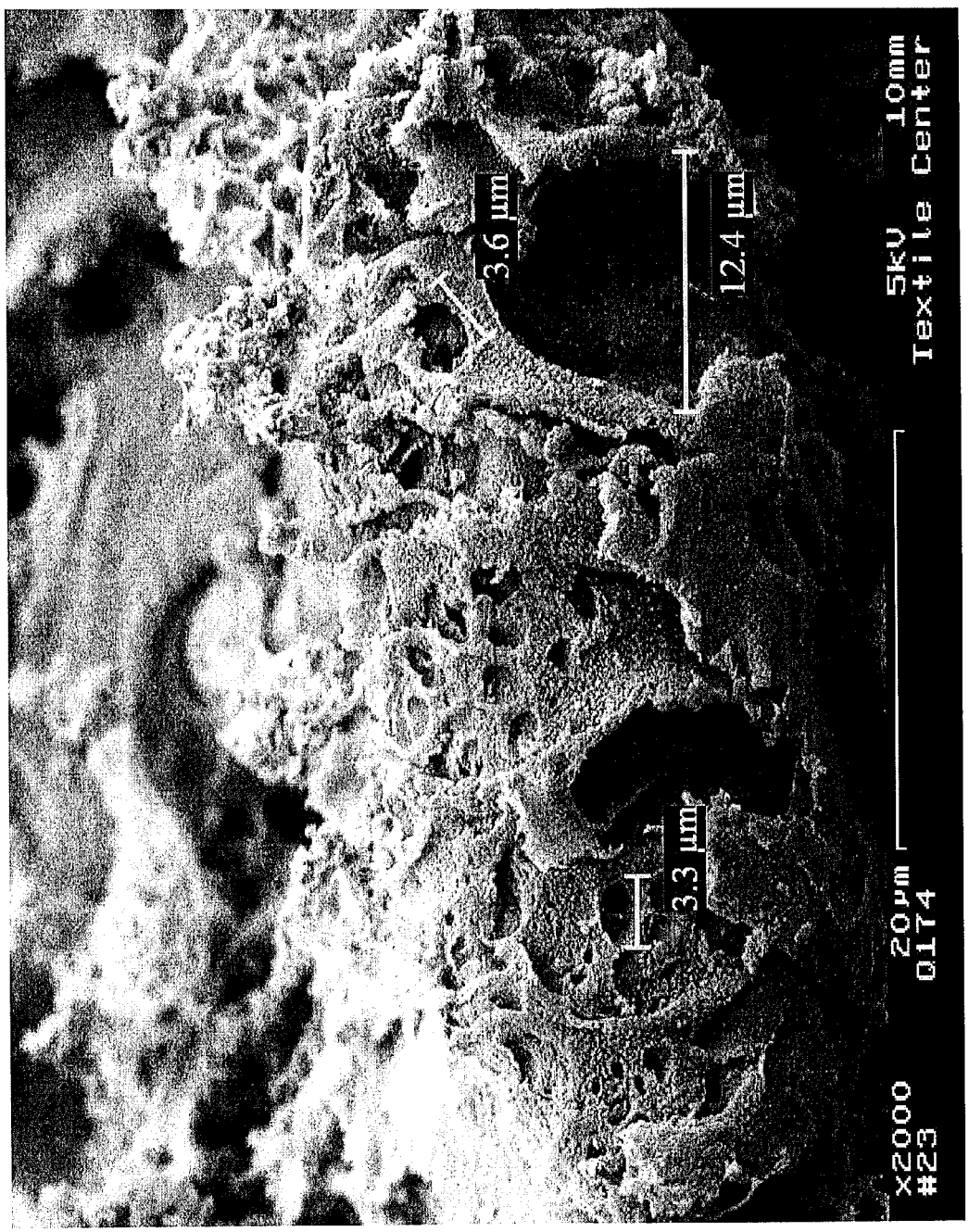
FIG. 1 is a photomicrograph of the inventive polybenzimidazole resin (2,000×SEM), with dimensions noted.

Polybenzimidazole (PBI) refers to, for example, the product of the melt polymerization of a tetra amine (e.g., aromatic and heteroaromatic tetra-amino compounds) and a second monomer being selected from the group consisting of free dicarboxylic acids, alkyl and/or aromatic esters of dicarboxylic acids, alkyl and/or aromatic esters of aromatic or heterocyclic dicarboxylic acid, and/or alkyl and/or aromatic anhydrides of aromatic or heterocyclic dicarboxylic acid. Further details may be obtained from U.S. Pat. Nos. Re 26065; 4,506,068; 4,814,530; and US Publication No. 2007/0151926, each of which is incorporated herein by reference. The PBI polymer may have an IV (inherent viscosity) in the range of 0.10-2.00 dL/g. IV (inherent viscosity), as used herein, is the ratio of the specific viscosity of a solution of known concentration to the concentration of the solute extrapolated to zero concentration, measured in units of dL/g (deciliters/gram). It is directly proportional to the polymer-average molecular weight, and is based on the concentration of the polymer sample tested, g/100 ml or g/deciliter. The polymer is dissolved at the 0.4% (w/v) level in 100 ml of 96.5% (+/−0.5%) sulfuric acid at 80° C. After filtering, an aliquot is measured for IV using a calibrated Cannon-Fenske capillary viscometer in a 25° C. (+/−0.1° C.) water bath, the flow time (sec.) of the PBI polymer solution measured vs. the dissolving solvent: $IV = \ln(t_1/t_2)/c$, where the natural log of the flow time of the PBI solution ($t_1$) over the flow time of the solvent ($t_2$) is divided by the PBI solution concentration (c).

The aromatic and heteroaromatic tetra-amino compounds, used in accordance with the invention, are preferably 3,3',4,4'-tetra-aminobiphenyl, 2,3,5,6-tetra-aminopyridine, 1,2,4,5-tetra-aminobenzene, 3,3',4,4'-tetra-aminodiphenylsulfone, 3,3',4,4'-tetra-aminodiphenyl ether, 3,3',4,4'-tetra-aminobenzophenone, 3,3',4,4'-tetra-aminodiphenyl methane, and 3,3',4,4'-tetra-aminodiphenyldimethylmethane, and their salts, in particular, their mono-, di-, tri-, and tetrahydrochloride derivatives.

The aromatic carboxylic acids used, in accordance with the invention, are dicarboxylic acids or its esters, or its anhydrides or its acid chlorides. The term "aromatic carboxylic acids" equally comprises heteroaromatic carboxylic acids as well. Preferably, the aromatic dicarboxylic acids are isophthalic acid, terephthalic acid, phthalic acid, 5-hydroxy-isophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-napthalenedicarboxylic acid, diphenic acid, 1,8-dihydroxynaphthalene-3,6-dicarboyxlic acid, diphenyl ether-4,4'-dicarboxylic acid, benzophenone-4,4'-dicarboxylic acid, diphenylsulfone-4,4'-dicarboyxlic acid, biphenyl-4,4'-dicarboxylic acid, 4-trifluoromethylphthalic acid, 2,2-bis(4-carboxyphenyl) hexafluoropropane, 4,4'-stilbenedicarboxylic acid, 4-carboxycinnamic acid, or their C1-C20-alkyl esters or C5-C12-aryl esters, or their acid anhydrides or their acid chlorides.

The heteroaromatic carboxylic acids used, in accordance with the invention, are heteroaromatic dicarboxylic acids or their esters or their anhydrides. The "heteroaromatic dicarboxylic acids" include aromatic systems that contain at least one nitrogen, oxygen, sulfur, or phosphorus atom in the ring. Preferably, it is pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridine dicarboxylic acid, 3,5-pyrazole dicarboxylic acid, 2,6-pyrimidine dicarboxylic acid, 2,5-pyrazine dicarboxylic acid, 2,4,6-pyridine tricarboxylic acid, and benzimidazole-5,6-dicarboxylic acid, as well as their C1-C20-alkyl esters or C5-C12-aryl esters, or their acid anhydrides or their acid chlorides.

The aromatic and heteroaromatic diaminocarboxylic acid used in accordance with the invention is preferably diaminobenzoic acid and its mono- and dihydrochloride derivatives.

Preferably, mixtures of at least 2 different aromatic carboxylic acids are used. These mixtures are, in particular, mixtures of N-heteroaromatic dicarboxylic acids and aromatic dicarboxylic acids or their esters. Non-limiting examples are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynapthalene-3,6-dicarboxylic acid, diphenyl ether-4,4'-dicarboxylic acid, benzophenone-4,4'-dicarboxylic acid, diphenylsulfone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidine dicarboxylic acid, and 2,5-pyrazine dicarboxylic acid. Preferably, it is the diphenyl isophthalate (DPIP) and its ester.

Examples of polybenzimidazoles which may be prepared according to the process as described above include:
poly-2,2'-(m-phenylene)-5,5'-bibenzimidazole;
poly-2,2'-(biphenylene-2"2''')-5,5'-bibenzimidazole;
poly-2,2'-(biphenylene-4"4''')-5,5'-bibenzimidazole;
poly-2,2'-(1",1'',3'''trimethylindanylene)-3''5''-p-phenylene-5,5'-bibenzimidazole;
2,2'-(m-phenylene)-5,5'-bibenzimidazole/2,2-(1",1'',3''-trimethylindanylene)-5''',3''-(p-phenylene)-5,5'-bibenzimidazole copolymer;
2,2'-(m-phenylene)-5,5-bibenzimidazole-2,2'-biphenylene-2'',2'''-5,5'-bibenzimidazole copolymer;
poly-2,2'-(furylene-2'',5'')-5,5'-bibenzimidazole;
poly-2,2'-(naphthalene-1'',6'')-5,5'-bibenzimidazole;
poly-2,2'-(naphthalene-2'',6'')-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2,2''-(m-phenylene)-5,5''-di(benzimidazole)propane-2,2; and
poly-ethylene-1,2-2,2''-(m-phenylene)-5,5''-(dibenzimidazole)ethylene-1,2 where the double bonds of the ethylene groups are intact in the final polymer. Poly-1,2'-(m-phenylene)-5,5'-bibenzimidazole, a preferred polymer, can be prepared by the reaction of 3,3',4,4'-tetraminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

Figure 2:
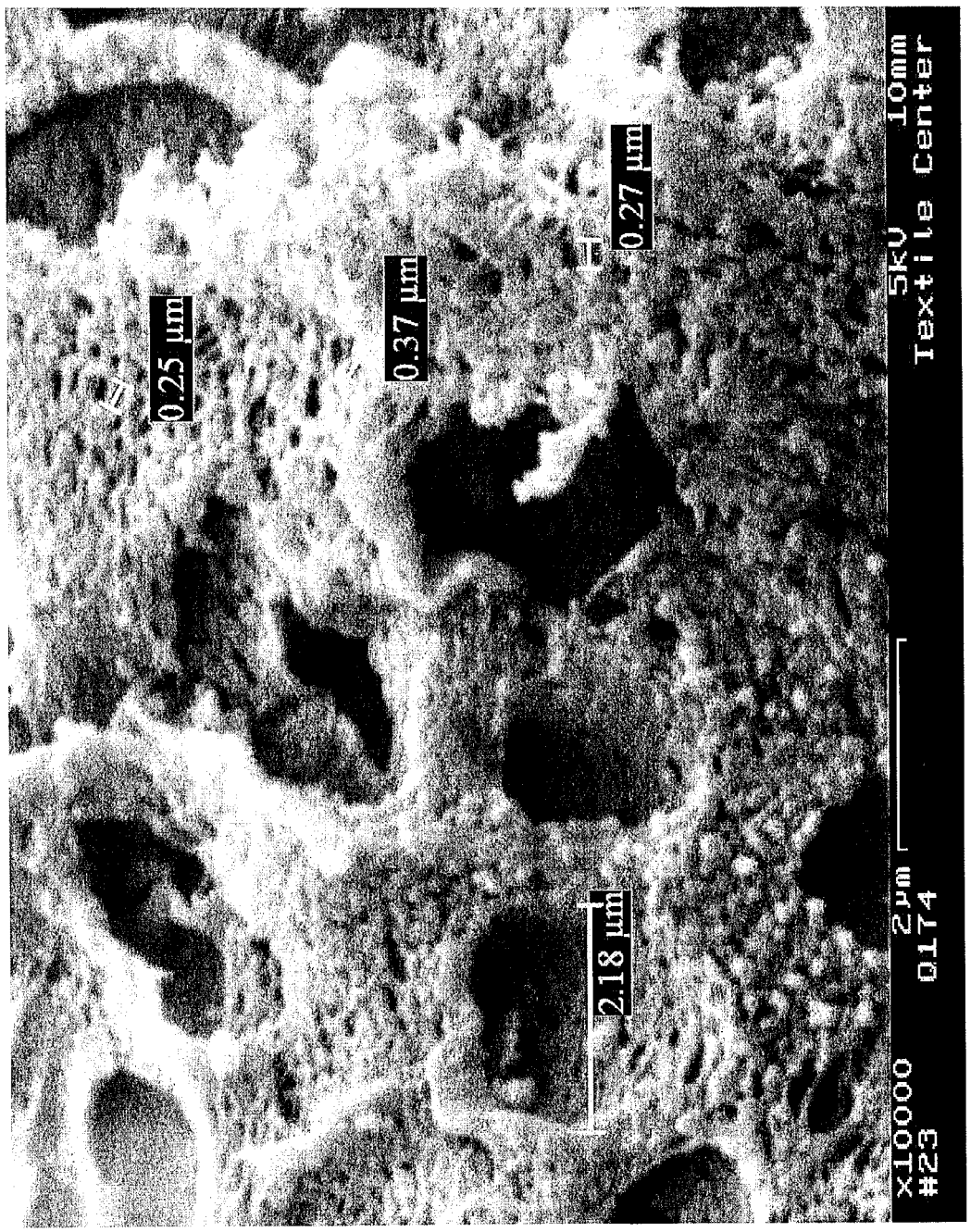
FIG. 2 is a photomicrograph of the inventive polybenzimidazole resin (10,000×SEM), with dimensions noted.
Figure 4:
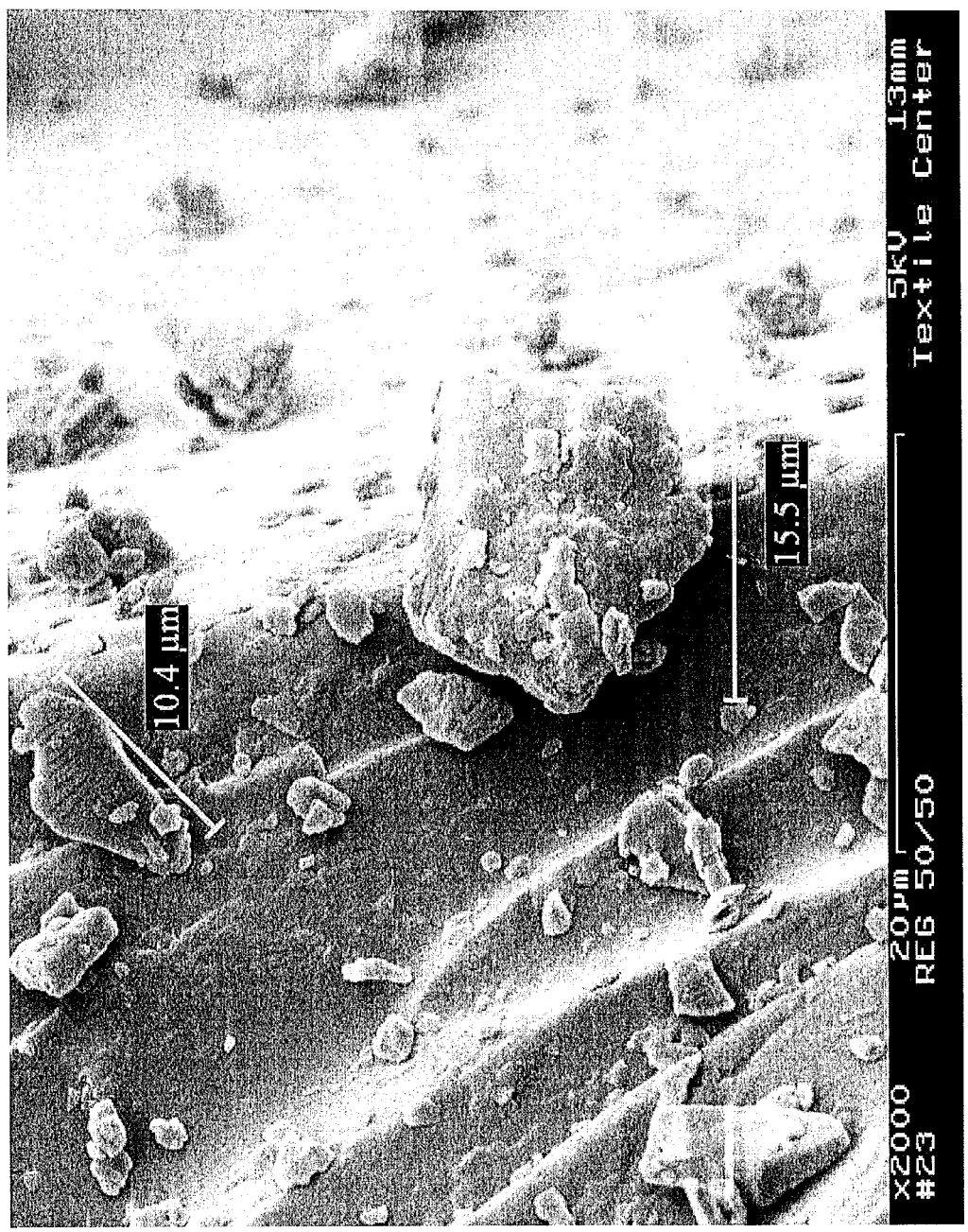
FIG. 4 is a photomicrograph of the parent polybenzimidazole resin (2,000×SEM), with dimensions noted.
Figure 5:
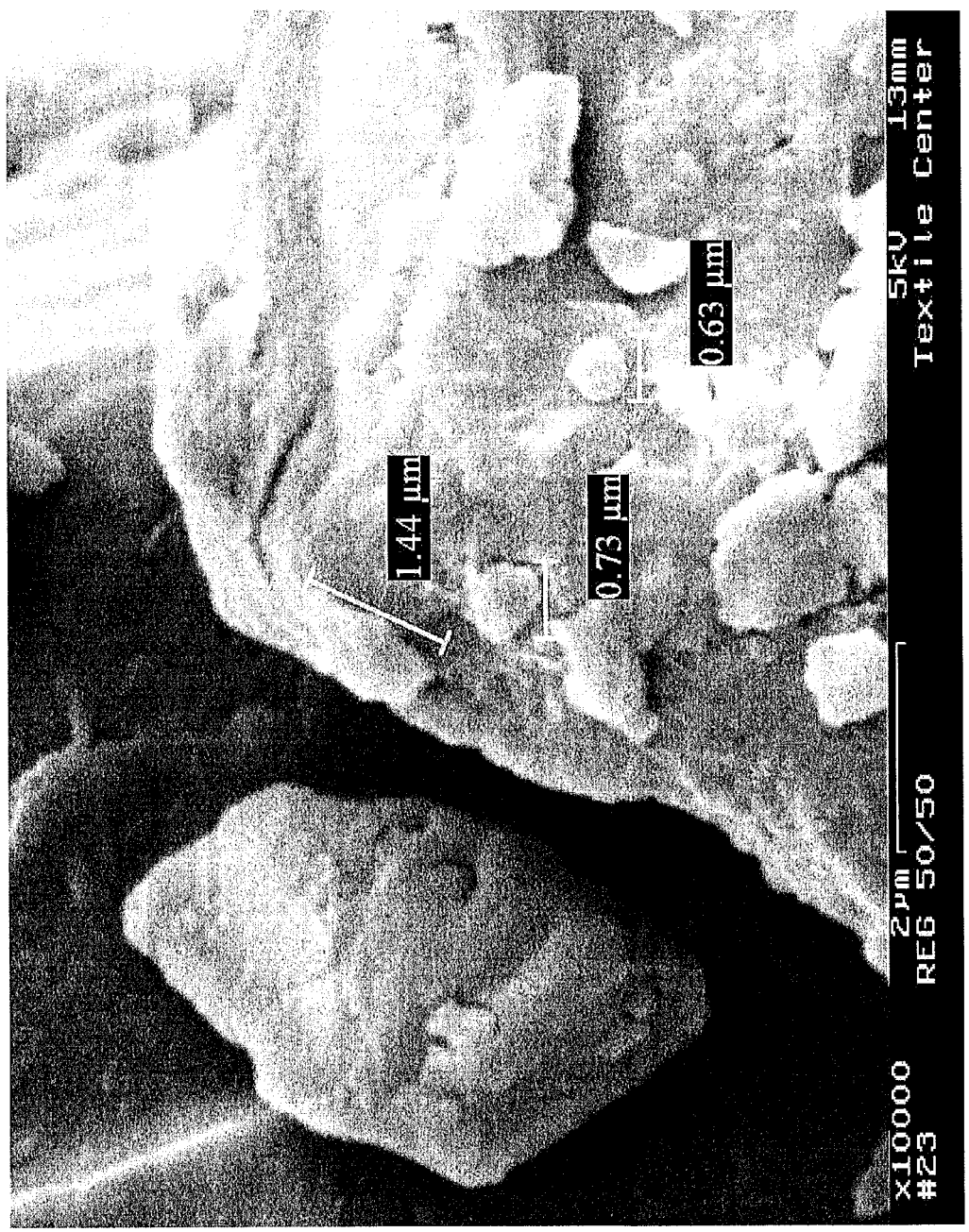
FIG. 5 is a photomicrograph of the parent polybenzimidazole resin (10,000×SEM), with dimensions noted.
Figure 6:
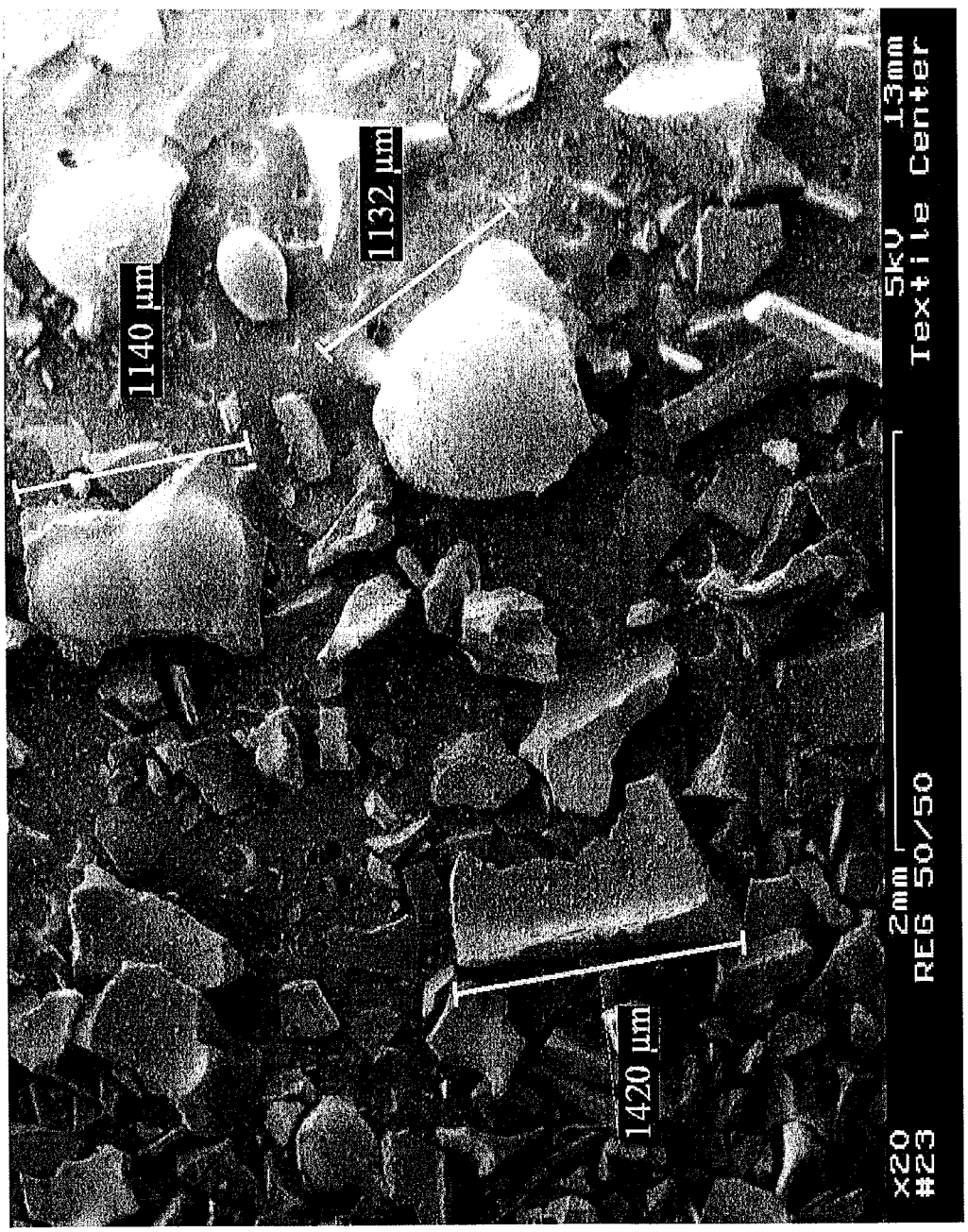
FIG. 6 is a photomicrograph of the parent polybenzimidazole resin (20×SEM), with dimensions noted.

The inventive polybenzimidazole resin is a porous polybenzimidazole (PBI) particulate. The inventive PBI resin is shown in FIGS. 1 (2,000×SEM), 2 (10,000×SEM), and 3 (20×SEM). As best seen in FIGS. 1 and 2, the surface of the resin is porous (or pitted) with pores (or cavities). In contrast, parent (virgin) PBI resin is shown in FIGS. 4 (2,000×SEM), 5, (10,000×SEM), and 6 (20×SEM). Parent (virgin) resin refers to resin harvested from the polymerization reactor (i.e., after crushing of the friable foam and typical sieving). In the parent (virgin) resin, as best seen in FIGS. 4 and 5, the resin has a generally smooth surface without any pores or cavities and is not pitted.

The porous PBI particulate may be further characterized as follows.

The particle size of the particulate, in one embodiment, may be less than 500 microns (μm). In another embodiment, the average particle size may be in the range of 50-500 microns. In yet another embodiment, the average particle size may be in the range of 100-400 microns.

The pores of the particulate, in one embodiment, may have average diameters of less than 3.0 microns. In another embodiment, the average diameters may be in the range of 0.01-3.0 microns. In yet another embodiment, the average diameter may be in the range of 0.1-2.5 microns.

The apparent density of the particulate, in one embodiment, may be less than 0.20 g/cc. In another embodiment, the apparent density may be in the range of 0.01-0.20 g/cc. In yet another embodiment, the apparent density may be in the range of 0.03-0.15 g/cc. In contrast, parent (virgin) PBI resin has an apparent density of greater than 0.40 g/cc. Apparent density is determined by ASTM-D1895 (2003), Method A (with pouring from a paper instead of a funnel, Section 7.3). Starting with a clean and dry measuring cup (88 ml), tare the empty cup. Then pour a pile of the resin onto a weighting paper, making sure that you have a greater volume of resin than the volume of the cup (e.g., >88 ml). Holding the resin filled paper with a bend in the middle about 1 inch (2.54 cm) above the cup, pour the resin lightly into the cup in a smooth motion until the resin overflows the cup. Without shaking or touching the cup (i.e., avoid compacting the sample, use a straight edge to strike off the excess resin at the top of the cup (do not add any additional resin if the level recedes). Clean the outside of the cup, as necessary. Weigh the filled cup to the nearest 0.1 g and record. Repeat the foregoing for a second time and average the results. Apparent density (g/cc)=(average weight of two samples)/cup volume.

The porous PBI particulate may be made by the following process. Parent (virgin) PBI resin is dissolved in a highly polar solvent. This solution is then contacted with a bath of a non-solvent for the PBI, where the dissolved PBI is precipitated. The precipitated PBI may be filtered and rinsed. Thereafter, the precipitated resin is dried.

The solution concentration of the parent PBI in the highly polar solvent may be, in one embodiment, in the range of 5-30% weight. In another embodiment, the concentration may be in the range of 8-27% weight.

The bath, in one embodiment, may be heated. The bath temperature, in another embodiment, may range from 50-90° C. In another embodiment, the temperature may range from 70-85° C.

The highly polar solvent may be any highly polar solvent capable of dissolving PBI. Such solvents include, but are not limited to, concentrated sulfuric acid ($H_2SO_4$), formic acid, dimethyl sulfoxide (DMSO), N,N-dimethyl acetamide (DMAc), N,N-dimethyl formamide (DMF), N-methyl-2-pyrrolidone (NMP), pyridine, and a mixture of a base, a liquid sulfoxide, and water or alcohol.

The bath may be any non-solvent for the PBI. Non-solvents may include, but are not limited to, water, methanol, and combinations thereof.

Contacting the parent PBI solution with the bath may have an impact upon the precipitation of the PBI in the non-solvent. Therefore, the parent solution should be slowly added to the bath. Moreover, it is preferred that the bath be agitated during contacting and precipitating.

After precipitating, the resin is separated from the bath by, for example filtration. The retentate should be thoroughly rinsed to remove any residual solvent and/or non-solvent.

After rinsing, the resin is dried. Drying may be accomplished at any temperature, in one embodiment the temperature is in the range of 180° C.

Dried porous PBI resin should be stored in a desiccated environment to avoid moisture regain until solvated for use.

The porous PBI particulate may be solvated at ambient temperatures and pressures using equipment readily available. The porous PBI particulate is mixed with a highly polar solvent at room temperatures and pressures, and agitation to dissolve the porous resin into solution. The highly polar solvents include, but are not limited to, N—N-dimethyl acetamide (DMAc), dimethylsulfoxide (DMSO), N—N-dimethylformamide (DMF), N-methyl-2-pyrrolidine (NMP), pyridine, and combinations thereof. Solutions concentrations of up to 40% by weight may be obtained.

EXAMPLES

The foregoing invention will be further illustrated in the following non-limiting examples.

Figure 3:
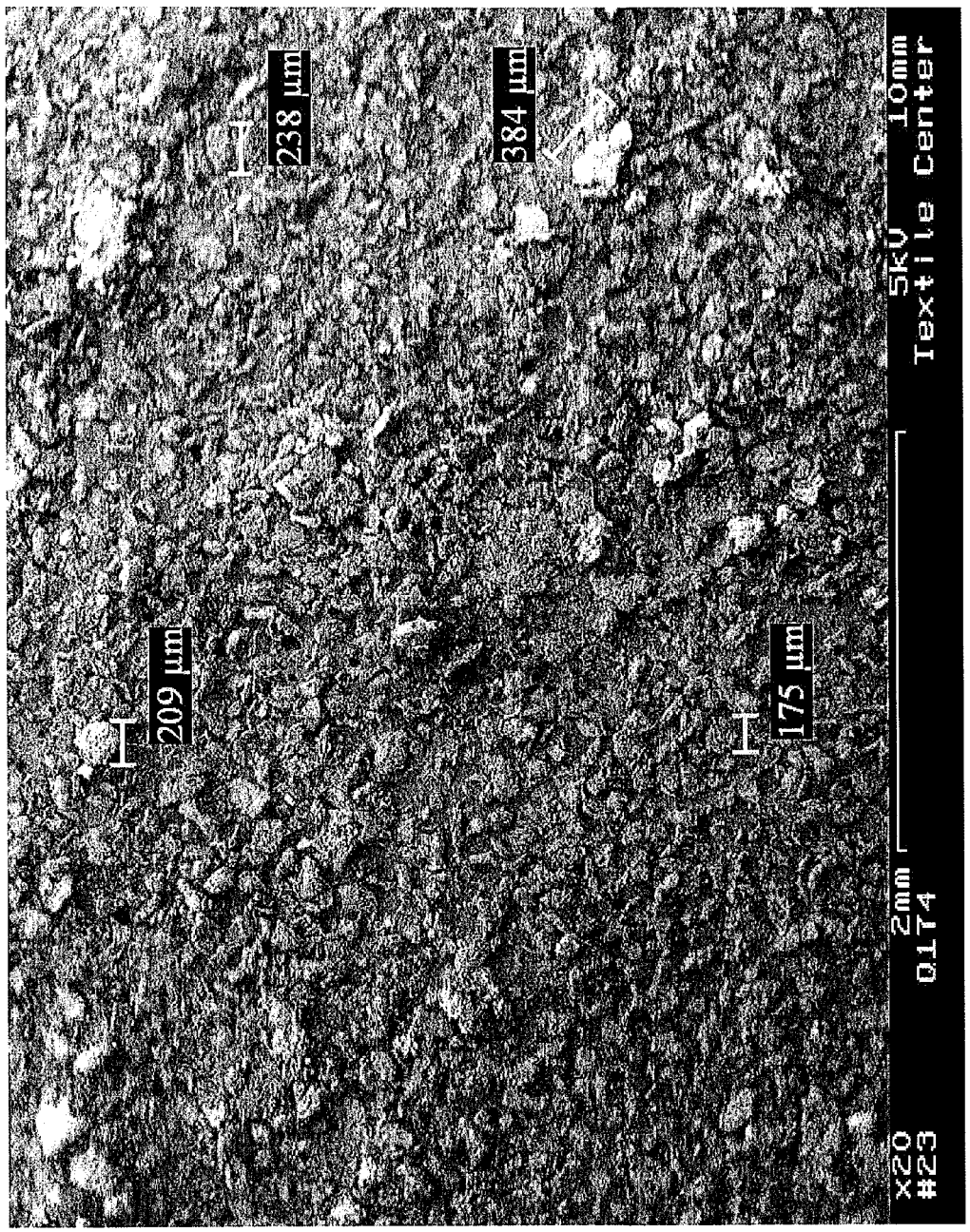
FIG. 3 is a photomicrograph of the inventive polybenzimidazole resin (20×SEM), with dimensions noted.

The inventive porous PBI particulate resin was made by the following procedure. 240 g of a 9% by weight solution of parent (virgin) PBI resin (0.8 IV) at 25° C. was slowly dripped (at about 10 ml/minute) into 6000 ml of agitated water at 80° C. Mixing continued at high speed (18,000 rpm) for 30 minutes. The resulting mixture was filtered through a Whatman 41 course filter paper (GE Healthcare Life Sciences, Piscataway, N.J.). The retentate was rinsed with hot water (60-80° C.) with a total rinse volume of 900 ml for every 900 ml of retentate (e.g., 3 rinses of 300 mls each). The rinsed retentate was gently scrapped off of the filter paper into a pan for drying. Drying was accomplished in an oven at 180° C.±5° C. for at least 3 hours. Large particles were sieved out with a #16 screen (1.19 mm). The sieved material was re-dried and stored (in a desiccator) until solution were made. Representative material is shown in FIGS. 1, 2, & 3. Subsequent analysis, DSC (differential scanning calorimeter) and TGA (thermogravometeric analysis) indicated that the heat flow curves and the degradation temperatures of the parent (virgin) and the porous resin were the same. Particle analysis (Coulter particle distributions) indicated that the porous resin had a smaller particle size than the parent (virgin) resin: porous resin—mode 185 µm, 95%<827 µm; parent (virgin) resin—mode 517 µm, 95%<1138 µm.

Solutions of the inventive porous resins were made as follows. 5.6 g of porous resin was added to each of 54.4 g DMAc, 54.4 DMSO, 54.4 g NMP, and 12 g of porous resin was added to 48 g of DMAc. These portions made respectively a 9% by weight DMAc solution, a 9% by weight DMSO solution, a 9% by weight NMP solution, and a 20% by weight DMAc solution. The porous resin was measured out with minimal exposure to air (to avoid moisture regain) and placed in a 125 ml (4 oz) capped bottle with the solvent. Each of the foregoing bottles was shaken for 1 hour and allowed to stand overnight. 60 g of the parent solution (9% by weight of the parent (virgin) resin in DMAc) was used as control. Each of the mixtures readily went into solution in their respective solvents under ambient temperatures and pressures. Upon visual observation on the day following shaking, all mixtures remained in solution with the exception of the 9% DMSO which phased out. After 2 days, the remaining solutions (9% DMAc, 9% NMP, and 20% DMAc) remained intact. This indicated adequate shelf life for these solutions. A comparison of the viscosity of the 9% DMAc porous resin and 9% DMAc parent (virgin) resin indicated no difference between the solutions.

The present invention may be embodied in other forms without departing from the spirit and the essential attributes thereof, and, accordingly, reference should be made to the appended claims, rather than to the foregoing specification, as indicated the scope of the invention.

We claim:

1. A method for dissolving a porous polybenzimidazole (PBI) particulate in a solvent at ambient temperatures and pressures comprising the steps of:
   providing the porous PBI particulate made by
      dissolving a virgin PBI resin in a highly polar solvent to form a solution;
      precipitating the solution in a bath; and
      drying the precipitated PBI resin, to form the porous PBI particulate having a particle size in the range of 50-500 microns, an average pore size diameter in the range of 0.1-3.0 microns, and an apparent density in the range of 0.01-0.20 g/cc; and
   dissolving the porous PBI particulate in the solvent at ambient temperatures and pressures, the solvent being selected from the group consisting of N—N-dimethyl acetamide (DMAc), dimethylsulfoxide (DMSO), N—N-dimethylformamide (DMF), N-methyl-2-pyrrolidine (NMP), pyridine, and combinations thereof.

2. The method of claim 1 wherein the virgin PBI resin is a sieved PBI resin.

3. The method of claim 1 wherein the highly polar solvent is selected from the group consisting of N—N-dimethyl acetamide (DMAc), dimethylsulfoxide (DMSO), N—N-dimethylformamide (DMF), N-methyl-2-pyrrolidine (NMP), pyridine, and combinations thereof.

4. The method of claim 1 wherein the bath comprises a non-solvent for the PBI resin.

5. The method of claim 4 wherein the non-solvent for the PBI resin includes water, methanol, and combinations thereof.

6. The method of claim 1 wherein the precipitating is conducted at a temperature in the range of 50-90° C.

7. The method of claim 1 wherein the precipitating is conducted at a temperature in the range of 60-80° C.

8. The method of claim 1 wherein the bath is agitated.

9. The method of claim 1 further comprises filtering the solution prior to the precipitating.

10. The method of claim 9 wherein filtering further comprises filtering through a filter has a mesh size of 25 microns or less.

11. The method of claim 1 further comprises separating the precipitated PBI resin from the bath.

12. The method of claim 1 wherein the precipitating is by dripping the solution directly into the bath.

\* \* \* \* \*